Patented Apr. 10, 1923.

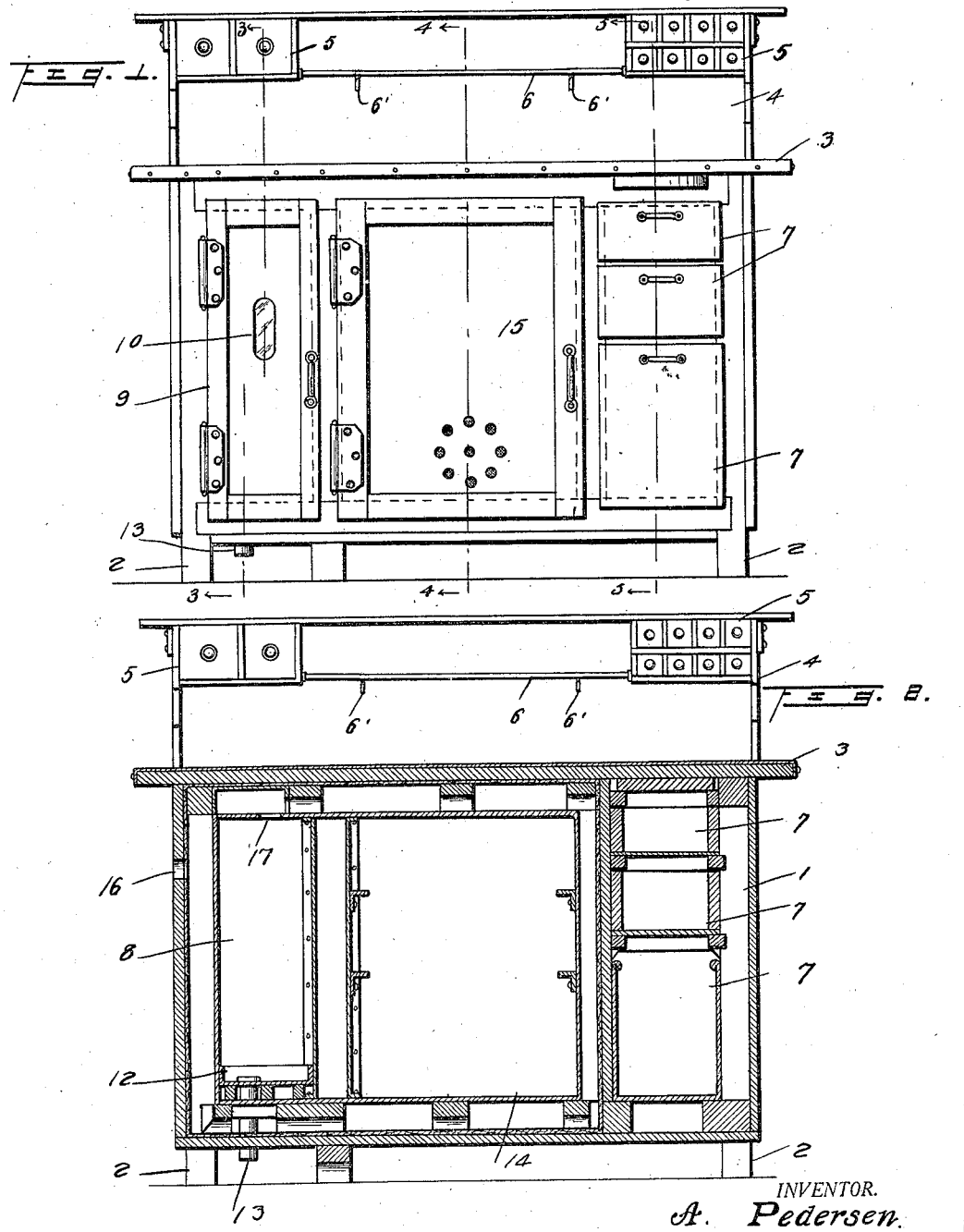

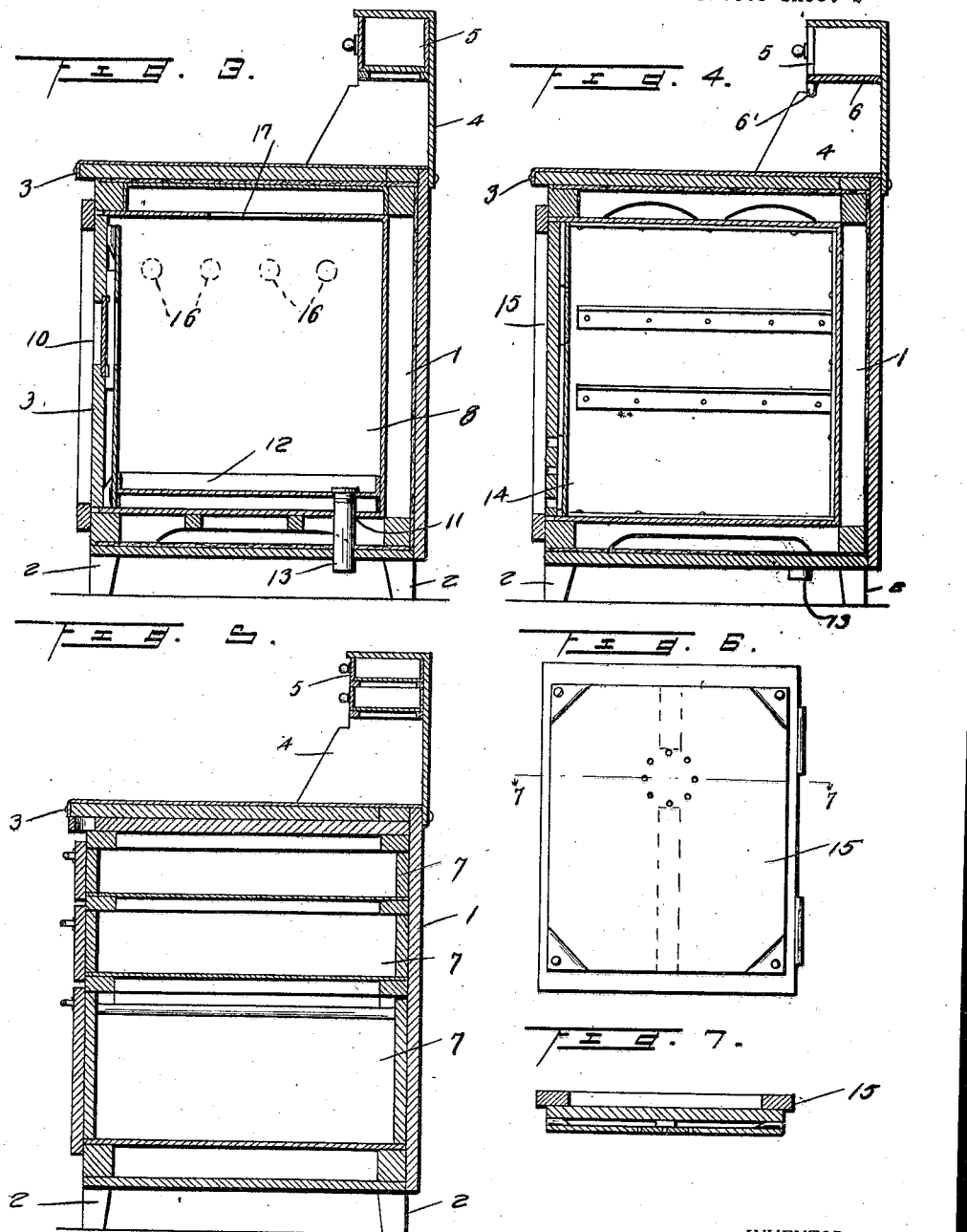

1,451,587

UNITED STATES PATENT OFFICE.

ANTON PEDERSEN, OF DAGMAR, MONTANA, ASSIGNOR OF ONE-HALF TO FRANZ W. BERG, OF GRENORA, NORTH DAKOTA.

KITCHEN CABINET.

Application filed May 19, 1920. Serial No. 382,479.

*To all whom it may concern:*

Be it known that I, ANTON PEDERSEN, a citizen of the United States, residing at Dagmar, in the county of Sheridan and State of Montana, have invented certain new and useful Improvements in Kitchen Cabinets; and I do hereby declare the following to be a full, clear, and exact description of the invention, such as will enable others skilled in the art to which it appertains to make and use the same.

This invention relates to kitchen cabinets and it consists in the novel features hereinafter described and claimed.

An object of the invention is to provide a cabinet of the character stated which may be used in the capacity of a bread raiser, bread receptacle, ice box and kitchen cabinet in general.

With this object in view the cabinet comprises a body having a compartment at the intermediate portion thereof which is normally closed by a hinged door. The said compartment is surrounded on three sides by a passage way which may conduct the heated or cold air around the compartment and regulate the temperature thereof. At one side of the compartment is arranged a second compartment adapted to receive and retain a lighted lamp when the first mentioned compartment is to be heated or warmed and which is adapted to receive a block of ice when the first mentioned compartment is to be maintained in a cool condition. At the opposite side of the first mentioned compartment are located a series of drawers which may retain articles, as for instance cutlery, linen, flour and the like. The top of the body constitutes the work board of the cabinet and a bracket is mounted thereon having receptacles for holding spices, sugar, rice and the like, and hooks for holding a rolling pin and the bracket is provided with suitable shelves on which articles may be placed.

In the accompanying drawings:

Figure 1 is a front view of the cabinet,

Figure 2 is a longitudinal sectional view of the same.

Figure 3 is a section on the line 3—3 of Fig. 1,

Fig. 4 is a section on the line 4—4 of Fig. 1,

Fig. 5 is a section on the line 5—5 of Fig. 1,

Fig. 6 is an inside elevation of the door, and

Fig. 7 is a section on the line 7—7 of Fig. 6.

The cabinet comprises a body 1 which is suitably mounted upon legs 2 in a usual manner. The top of the body 1 is in the form of a work board and is indicated at 3. A bracket 4 is mounted upon the upper rear portion of the work board and is provided with compartments 5 adapted to receive spices, sugar, rice and the like. The said bracket is further provided with shelving having hooks 6 upon which a rolling pin may be supported. The top surface of the work board 3 may be covered with tin or other metal if desired. The body 1 may retain at one end a series of drawers 7 in which may be stored cutlery, linen, flour and other similar articles.

At its opposite end the body 1 is provided with a chamber 8 which is adapted to retain a block of ice when the cabinet is used for cooling purposes and adapted to retain a lighted lamp when the cabinet is used for warming purposes. The chamber 8 is provided at its front side with a hinged door 9 which forms a closure for the chamber and the door is provided with a transparent panel 10 through which the interior of the chamber may be observed when the door is at a closed position. The body 1 is provided at the lower side of the chamber 8 with an opening 11 through which air may pass from the exterior to the interior of said body. A tray 12 may be positioned in the lower portion of the chamber 8 and said tray may hold a block of ice, this tray is provided with a sleeve 13 which may be inserted through the opening 11 to permit the drip from the ice to pass out of the chamber 8.

The body 1 is provided with a compartment 14 which is located between the chamber 8 and the drawers 7 and the compartment 14 is normally closed by a hinged door 15. The top side of the compartment 14 is spaced from the lower surface of the work board 3, one vertical side of the compartment 14 is spaced from the partition of the body 1 against which the drawers 7 are located, the bottom side of the compartment 14 is spaced from the bottom of the body 1 and the bottom of the chamber 8 is spaced from the bottom of the body 1. The end wall of the body 1 is spaced from the outer wall of the chamber 8 and is provided with openings 16. The top wall of the chamber 8 is provided with an opening 17 which communicates with the space between the top wall of the compartment 14 and the work board 3.

When the cabinet is used for raising dough or for setting sponge dough the dough is placed in the compartment 14 and the door is closed. A lighted lamp is placed in the chamber 8 and the door 9 is closed. Cool air from the exterior enters the chamber 8 through the opening 11 and is heated by coming in contact with the lamp or the heat radiating therefrom. The heated air passes up through the opening 17 and passes around the top side of the compartment 14 down along the side which is in the vicinity of the drawers 7, along the under side of the compartment and between the compartment and the bottom side of the body 1 then along the under side of the chamber 8 and up along the outer side of the chamber 8 and out through the openings 16. Thus the contents of the compartment 14 is heated and maintained at a uniform degree of temperature.

When the device is used for keeping articles cool the articles are placed in the compartment 14 and the door 15 is closed. A block of ice is placed upon the tray 12 and the cooled air from the block of ice passes down through the tubular member 13 and out from the chamber 8. This downdraft of air will cause a circulation of air to be set up in the cabinet, the same entering at the opening 16 and passing down through the space between the end wall of the cabinet and the chamber 8 when it will be cooled by contact with the wall of the chamber and thence through the space beneath the chamber and article compartment and over and around the article compartment and will enter through the opening 17 of the chamber and escape in the manner heretofore described. From this it will be seen that the circulation of air when the device is used as a refrigerator will be directly opposite to that when the device is used as a heater.

From the foregoing description taken in conjunction with the accompanying drawings it will be seen that a kitchen cabinet of simple and durable structure is provided and that the same may be conveniently used for all the purposes to which such a cabinet is usually put and in addition the cabinet may be employed for keeping articles at a uniform degree of high temperature and also for keeping articles at a uniform degree of relatively low temperature.

Having thus described the invention, what is claimed is:—

A cabinet of the class described having an article compartment, a chamber at one side of said compartment and spaced therefrom to provide a moisture trap between the article compartment and chamber, a second compartment in said cabinet and spaced from the article compartment and at the opposite side thereof from that at which is located, said second compartment being spaced and insulated from the article compartment, means to space said article compartment and chamber from the walls of the cabinet, said chamber having an opening through its bottom wall in alignment with an opening in the bottom wall of the cabinet, a tubular connection between said openings, said chamber having an opening in its upper end, said cabinet having an opening in one end wall, the means for spacing the chamber and article compartment from the walls of the cabinet being so arranged as to direct a temperature changing medium in through one pair of openings in the cabinet and chamber and out through the second pair of said openings, said spacing means also serving to direct said temperature changing medium about said article compartment.

In testimony whereof I affix my signature in presence of two witnesses.

ANTON PEDERSEN.

Witnesses:
FRANZ W. BERG,
ALVIN NESS.